United States Patent
Laaksonen

(10) Patent No.: US 11,096,004 B2
(45) Date of Patent: Aug. 17, 2021

(54) SPATIAL AUDIO RENDERING POINT EXTENSION

(71) Applicant: Nokia Technologies Oy, Espoo (FI)

(72) Inventor: Lasse Juhani Laaksonen, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 15/412,561

(22) Filed: Jan. 23, 2017

(65) Prior Publication Data
US 2018/0213344 A1 Jul. 26, 2018

(51) Int. Cl.
| | |
|---|---|
| H04S 7/00 | (2006.01) |
| G06F 3/16 | (2006.01) |
| G06F 3/01 | (2006.01) |
| H04S 3/00 | (2006.01) |
| G10L 17/22 | (2013.01) |

(Continued)

(52) U.S. Cl.
CPC .............. *H04S 7/303* (2013.01); *G06F 3/011* (2013.01); *G06F 3/012* (2013.01); *G06F 3/167* (2013.01); *H04S 3/008* (2013.01); *G06F 3/04847* (2013.01); *G10L 17/22* (2013.01); *H04L 51/04* (2013.01); *H04S 2400/01* (2013.01); *H04S 2400/11* (2013.01)

(58) Field of Classification Search
CPC ...... H04S 7/303; H04S 3/008; H04S 2400/01; H04S 2400/11; G06F 3/012; G06F 3/04847; G06F 3/013; G06F 3/011; H04L 51/046; H04L 51/04; G10L 17/22; A63F 13/87
See application file for complete search history.

(56) References Cited

U.S. PATENT DOCUMENTS

| | | | |
|---|---|---|---|
| 5,450,494 A | 9/1995 | Okubo | .................... 348/E5.122 |
| 5,633,993 A * | 5/1997 | Redmann | ................ G06F 3/011 |
| | | | 345/419 |

(Continued)

FOREIGN PATENT DOCUMENTS

| | | |
|---|---|---|
| CN | 1857027 A | 11/2006 |
| CN | 101999067 A | 3/2011 |

(Continued)

OTHER PUBLICATIONS

Unity, 3D_Audio, 2011.*

(Continued)

*Primary Examiner* — Duc Nguyen
*Assistant Examiner* — Kuassi A Ganmavo
(74) *Attorney, Agent, or Firm* — Harrington & Smith

(57) ABSTRACT

A method including, determining, for a user located at a location corresponding to a free-viewpoint rendering, a spatial rendering point extension, where the spatial rendering point extension is spaced away from the location in the free-viewpoint rendering, and rendering to the user an audio object based upon the spatial rendering point extension, where without the spatial rendering point extension the audio object is either: not able to be heard by the user, or is heard differently by the user while the user is at the location, such that the rendering of the audio object based upon the spatial rendering point extension allows the user to hear the audio object while the user is at the location or allows the user to hear the audio object differently while the user is at the location.

19 Claims, 7 Drawing Sheets

(51) Int. Cl.
  *G06F 3/0484* (2013.01)
  *H04L 12/58* (2006.01)

(56) References Cited

U.S. PATENT DOCUMENTS

| | | | |
|---|---|---|---|
| 5,754,939 A | 5/1998 | Herz | |
| 6,151,020 A | 11/2000 | Palmer | |
| 6,330,486 B1* | 12/2001 | Padula | G06F 3/011 381/306 |
| 7,099,482 B1 | 8/2006 | Jot et al. | 381/61 |
| 7,266,207 B2 | 9/2007 | Wilcock et al. | |
| 7,492,915 B2 | 2/2009 | Jahnke | |
| 7,840,668 B1* | 11/2010 | Sylvain | A63F 13/54 709/224 |
| 8,187,093 B2 | 5/2012 | Hideya et al. | |
| 8,189,813 B2 | 5/2012 | Muraoka et al. | |
| 8,411,880 B2 | 4/2013 | Wang et al. | |
| 8,509,454 B2 | 8/2013 | Kirkeby et al. | |
| 8,831,255 B2 | 9/2014 | Crawford et al. | |
| 8,990,078 B2 | 3/2015 | Nakadai et al. | |
| 9,161,147 B2 | 10/2015 | Korn | |
| 9,179,232 B2 | 11/2015 | Jarske et al. | |
| 9,197,979 B2 | 11/2015 | Lemieux et al. | |
| 9,215,539 B2 | 12/2015 | Kim et al. | |
| 9,271,081 B2 | 2/2016 | Corteel et al. | |
| 2002/0150254 A1 | 10/2002 | Wilcock et al. | |
| 2006/0025216 A1* | 2/2006 | Smith | A63F 13/87 463/35 |
| 2008/0123864 A1 | 5/2008 | Reichelt et al. | |
| 2008/0144864 A1 | 6/2008 | Huon | |
| 2008/0247567 A1 | 10/2008 | Kjolerbakken et al. | |
| 2009/0138805 A1 | 5/2009 | Hildreth | |
| 2009/0240359 A1* | 9/2009 | Hyndman | H04L 65/4015 700/94 |
| 2009/0253512 A1* | 10/2009 | Nickell | A63F 13/87 463/42 |
| 2009/0262946 A1 | 10/2009 | Dunko | |
| 2010/0098274 A1 | 4/2010 | Hannemann et al. | |
| 2010/0119072 A1 | 5/2010 | Ojanpera | |
| 2010/0169796 A1* | 7/2010 | Lynk | A63F 13/10 715/757 |
| 2010/0208905 A1 | 8/2010 | Franck et al. | |
| 2011/0002469 A1 | 1/2011 | Ojala | |
| 2011/0129095 A1 | 6/2011 | Avendano et al. | |
| 2011/0166681 A1 | 7/2011 | Lee et al. | |
| 2012/0027217 A1 | 2/2012 | Jun et al. | |
| 2012/0093320 A1* | 4/2012 | Flaks | H04S 7/301 381/17 |
| 2012/0230512 A1 | 9/2012 | Ojanpera | |
| 2012/0232910 A1* | 9/2012 | Dressier | G10L 19/008 704/500 |
| 2012/0295637 A1 | 11/2012 | Hannuksela | |
| 2013/0114819 A1 | 5/2013 | Melchior et al. | |
| 2013/0259243 A1 | 10/2013 | Herre et al. | |
| 2013/0321396 A1* | 12/2013 | Kirk | G06T 15/205 345/419 |
| 2013/0321586 A1 | 12/2013 | Kirk et al. | |
| 2014/0010391 A1 | 1/2014 | Ek et al. | |
| 2014/0133661 A1 | 5/2014 | Harma et al. | 381/22 |
| 2014/0153753 A1 | 6/2014 | Crockett | 381/307 |
| 2014/0285312 A1* | 9/2014 | Laaksonen | H04R 3/12 340/4.42 |
| 2014/0328505 A1 | 11/2014 | Heinemann et al. | |
| 2014/0350944 A1 | 11/2014 | Jot et al. | |
| 2014/0361976 A1* | 12/2014 | Osman | G06T 19/006 345/156 |
| 2015/0002388 A1 | 1/2015 | Weston et al. | |
| 2015/0003616 A1 | 1/2015 | Middlemiss et al. | |
| 2015/0055937 A1* | 2/2015 | Van Hoff | H04N 13/0014 386/285 |
| 2015/0063610 A1 | 3/2015 | Mossner | |
| 2015/0078594 A1 | 3/2015 | Mcgrath et al. | 381/300 |
| 2015/0116316 A1* | 4/2015 | Fitzgerald | G02B 27/01 345/419 |
| 2015/0146873 A1 | 5/2015 | Chabanne et al. | 7/305 |
| 2015/0223002 A1 | 8/2015 | Mehta et al. | 7/30 |
| 2015/0245153 A1 | 8/2015 | Malak | 381/57 |
| 2015/0263692 A1 | 9/2015 | Bush | |
| 2015/0302651 A1 | 10/2015 | Shpigelman | |
| 2015/0316640 A1 | 11/2015 | Jarske et al. | |
| 2015/0362733 A1 | 12/2015 | Spivack | |
| 2016/0050508 A1 | 2/2016 | Redmann | |
| 2016/0084937 A1 | 3/2016 | Lin | |
| 2016/0112819 A1 | 4/2016 | Mehnert et al. | |
| 2016/0125867 A1 | 5/2016 | Jarvinen et al. | |
| 2016/0142830 A1 | 5/2016 | Hu | |
| 2016/0150267 A1 | 5/2016 | Strong | |
| 2016/0150343 A1 | 5/2016 | Wang et al. | |
| 2016/0150345 A1 | 5/2016 | Jang | |
| 2016/0182944 A1 | 6/2016 | Han et al. | H04N 21/4396 |
| 2016/0192105 A1 | 6/2016 | Breebaart et al. | |
| 2016/0212272 A1 | 7/2016 | Srinivasan et al. | |
| 2016/0227337 A1 | 8/2016 | Goodwin et al. | |
| 2016/0227338 A1 | 8/2016 | Oh et al. | |
| 2016/0266865 A1 | 9/2016 | Tsingos | |
| 2016/0300577 A1 | 10/2016 | Fersch et al. | |
| 2016/0313790 A1 | 10/2016 | Clement et al. | |
| 2017/0077887 A1 | 3/2017 | You | |
| 2017/0110155 A1 | 4/2017 | Campbell et al. | |
| 2017/0150252 A1 | 5/2017 | Trestain et al. | |
| 2017/0165575 A1* | 6/2017 | Ridihalgh | H04S 7/303 |
| 2017/0169613 A1* | 6/2017 | VanBlon | G06F 3/165 |
| 2017/0208415 A1 | 7/2017 | Ojala | |
| 2017/0223478 A1 | 8/2017 | Jot et al. | |
| 2017/0230760 A1 | 8/2017 | Sanger et al. | |
| 2017/0289486 A1* | 10/2017 | Stroffolino | H04N 5/44513 |
| 2017/0295446 A1 | 10/2017 | Thagadur Shivappa | |
| 2017/0366914 A1* | 12/2017 | Stein | H04S 7/304 |
| 2019/0329129 A1 | 10/2019 | Fajt et al. | |

FOREIGN PATENT DOCUMENTS

| | | | | |
|---|---|---|---|---|
| CN | 102668374 A | 9/2012 | | |
| CN | 102855133 A | 1/2013 | | |
| CN | 103702072 A | 4/2014 | | |
| CN | 104010265 A | 8/2014 | | |
| CN | 104041081 A | 9/2014 | | |
| CN | 104737557 A | 6/2015 | | |
| CN | 105611481 A | 5/2016 | | |
| EP | 2688318 A1 | 1/2014 | | |
| GB | 2540175 A | 1/2017 | | |
| NL | WO 2013064943 A1 * | 5/2013 | | H04S 1/005 |
| WO | WO-2009092060 A2 * | 7/2009 | | A63F 13/10 |
| WO | WO-2010/020788 A1 | 2/2010 | | |
| WO | WO-2011/020067 A1 | 2/2011 | | |
| WO | WO-2011020065 A1 | 2/2011 | | |
| WO | WO-2013/064943 A1 | 5/2013 | | |
| WO | WO-2013155217 A1 * | 10/2013 | | G06T 19/006 |
| WO | WO-2014/130221 A1 | 8/2014 | | |
| WO | WO-2014168901 A1 | 10/2014 | | |
| WO | WO-2015/152661 A1 | 10/2015 | | |
| WO | WO-2016014254 A1 | 1/2016 | | |
| WO | WO-2017120681 A1 | 7/2017 | | |

OTHER PUBLICATIONS

Wozniewski et al (User Specific audio rendering and steerable sound for distributed virtual environment, 2007.*
Li, Loco Radio Designing High Density Augmented Reality Audio Browsers, PhD Thesis Final, MIT, 2014.*
Alessandro Pieropan, Giampiero Salvi, Karl Pauwels, Hedvig Kjellstrom *Audio-Visual Classification and Detection of Human Manipulation Actions* [https://www.csc.kth.se/~hedvig/publications/iros_14.pdf] retrieved Sep. 29, 2017.
Micah T. Taylor, Anish Chandak, Lakulish Antani, Dinesh Manocha, *RESound: Interactive Sound Rendering for Dynamic Virtual Environments* MM'09, Oct. 19-24, 2009, Beijing, China. http://gamma.cs.unc.edu/Sound/RESound/.
Hatala, Marek et al., "Ontology-Based User Modeling in an Augmented Audio Reality System for Museums", http://citeseerx.ist.psu.edu/viewdoc/download?doi=10.1.1.91.5712&rep=rep1&type=pdf; Aug. 29, 2016, 38 pgs.

(56) References Cited

OTHER PUBLICATIONS

Gunel, Banu et al., "Spatial Synchronization of Audiovisual Objects by 3D Audio Object Coding", IEEE 2010, pp. 460-465; https://www.researchgate.net/profile/E_Ekmekcioglu/publication/251975482_Spatial_synchronization_of_audiovisual_objects_by_3D_audio_object_coding/links/54e783660cf2f7aa4d4d858a.pdf>; 2010.

Cameron Faulkner, "*Google's Adding Immersive Audio to your Virtual Reality Worlds*" http://www.in.techradar.com/news/misc/googlesaddingimmersiveaudiotoyourvrworlds/articleshow/57191578.cms retrieved Feb. 16, 2017.

Simon Galvez, Marcos F.; Menzies, Dylan; Fazi, Filippo Maria; de Campos, Teofilo; Hilton, Adrian "A Listener Position Adaptive Stereo System for Object-Based Reproduction" http://www.aes.org/e-lib/browse.cfm?elib=17670 dated May 6, 2017.

Anil Camci, Paul Murray, Angus Graeme Forbes, "*A Web-based UI for Designing 3D Sound Objects and Virtual Sonic Enviroments*" Electronic Visualization Laboratory, Department of Computer Science, University of Illinois at Chicago retrieved May 16, 2017.

Heaney Oh "The Future of VR Audio-3 Trends to Track This Year" dated Jul. 4, 2017.

Carl Schissler, Aaron Nicholls, and Ravish Mehra "Efficient HRTF-Based Spatial Audio for Area and Volumetric Sources" [retrieved Jan. 31, 2018].

Hasan Khaddour, Jiri Schimmel, Frantisek Rund "A Novel Combined System of Direction Estimation and Sound Zooming of Multiple Speakers" Radioengineering, vol. 24, No. 2, Jun. 2015.

\* cited by examiner

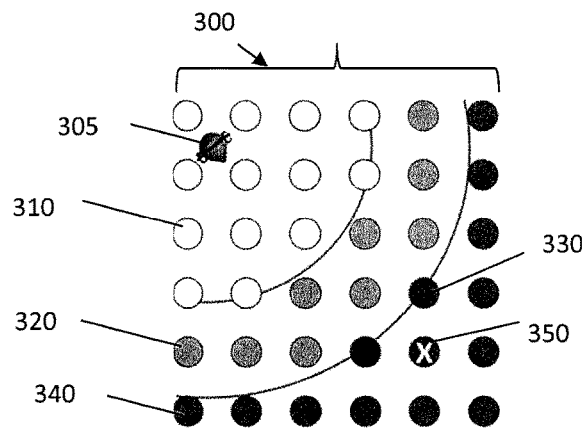
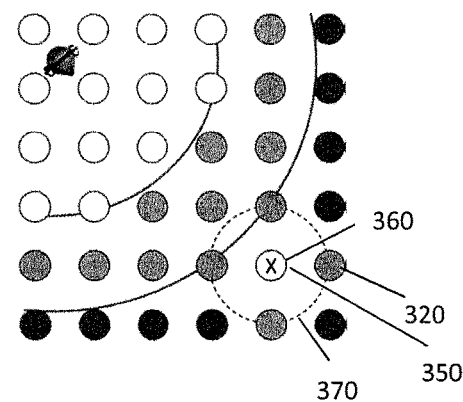
Fig. 3a  Fig. 3b
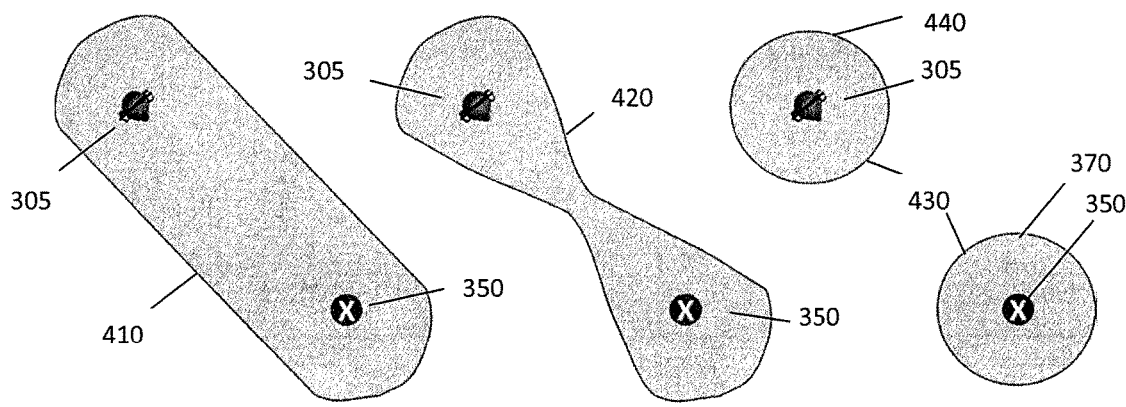
Fig. 4a  Fig. 4b  Fig. 4c

SPATIAL AUDIO RENDERING POINT EXTENSION

BACKGROUND

Technical Field

The exemplary and non-limiting embodiments relate generally to audio objects and, more particularly, to providing a spatial audio rendering point extension and managing extension-driven audio object interactions.

Brief Description of Prior Developments

Free-viewpoint, in an audiovisual consumption, refers to a user being able to move in the content consumption space. A non-free viewpoint virtual reality experience is limited to changing the direction of the viewpoint (rotation), but free-viewpoint rendering allows changing the point of rendering via moving (such as, translation for example) as well as changing the direction of the viewpoint (rotation). Providing an audio object in free-viewpoint rendering is known. For free-viewpoint rendering, the geometric transformation, thus, includes 3D rotation and 2D translation or 3D translation. Free-viewpoint audio allows for the user to move around in the audio (or generally, audio-visual or mediated reality) space and experience it correctly according to his/her location and orientation in the space. The spatial audio may consist, for example, of a channel-based bed and audio objects. While moving in the space, the user may come into contact with audio objects, he may distance himself considerably from other objects, and new objects may also appear. Not only is the listening/rendering point thus adapting to a user's movement, but the user may interact with the audio objects, and the audio content may otherwise evolve due to the changes in the rendering point.

SUMMARY

The following summary is merely intended to be exemplary. The summary is not intended to limit the scope of the claims.

In accordance with one aspect, an example method comprises, determining, for a user located at a location in a space that corresponds to a free-viewpoint rendering, a spatial rendering point extension, where the spatial rendering point extension is spaced away from the location in the free-viewpoint rendering, and while the user is at the location, rendering to the user at least one audio object based upon the determined spatial rendering point extension, where without the spatial rendering point extension the at least one audio object is either: not able to be heard by the user while the user is at the location, or is heard differently by the user while the user is at the location, such that the rendering of the at least one audio object based upon the determined spatial rendering point extension allows the user to hear the at least one audio object while the user is at the location or allows the user to hear the at least one audio object differently while the user is at the location.

In accordance with another aspect, an example apparatus comprises at least one processor; and at least one non-transitory memory including computer program code, the at least one memory and the computer program code configured to, with the at least one processor, cause the apparatus to: determine, for a user located at a location in a space that corresponds to a free-viewpoint rendering, a spatial rendering point extension, where the spatial rendering point extension is spaced away from the location in the free-viewpoint rendering; and while the user is at the location, render to the user at least one audio object based upon the determined spatial rendering point extension, where without the spatial rendering point extension the at least one audio object is either: not able to be heard by the user while the user is at the location, or is heard differently by the user while the user is at the location, such that the rendering of the at least one audio object based upon the determined spatial rendering point extension allows the user to hear the at least one audio object while the user is at the location or allows the user to hear the at least one audio object differently while the user is at the location.

In accordance with another aspect, an example apparatus comprises a non-transitory program storage device readable by a machine, tangibly embodying a program of instructions executable by the machine for performing operations, the operations comprising: during a free-viewpoint rendering to a user, determining, for a user located at a location in a space that corresponds to a free-viewpoint rendering, a spatial rendering point extension, where the spatial rendering point extension is spaced away from the location in the free-viewpoint rendering; and while the user is at the location, rendering to the user at least one audio object based upon the determined spatial rendering point extension, where without the spatial rendering point extension the at least one audio object is either: not able to be heard by the user while the user is at the location, or is heard differently by the user while the user is at the location, such that the rendering of the at least one audio object based upon the determined spatial rendering point extension allows the user to hear the at least one audio object while the user is at the location or allows the user to hear the at least one audio object differently while the user is at the location.

BRIEF DESCRIPTION OF THE DRAWINGS

The foregoing aspects and other features are explained in the following description, taken in connection with the accompanying drawings, wherein:

FIGS. 3a and 3b are example illustrations of a user rendering point and a spatial rendering point extension;

FIGS. 4a-4c are diagrams illustrating different spatial rendering areas based on a spatial audio rendering point extension;

DETAILED DESCRIPTION OF EMBODIMENTS

Figure 1:
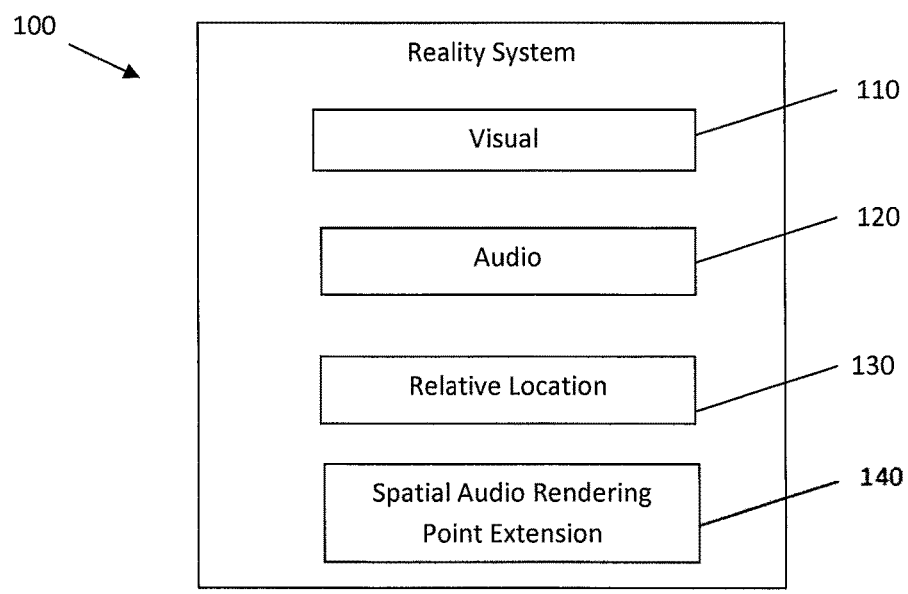
FIG. 1 is a diagram illustrating a reality system comprising features of an example embodiment.

Referring to FIG. 1, a diagram is shown illustrating a reality system 100 incorporating features of an example embodiment. The reality system 100 may be used by a user for augmented-reality (AR), virtual-reality (VR), or presence-captured (PC) experiences and content consumption, for example, which incorporate free-viewpoint audio. Although the features will be described with reference to the example embodiments shown in the drawings, it should be understood that features can be embodied in many alternate forms of embodiments.

The system 100 generally comprises a visual system 110, an audio system 120, a relative location system 130 and a spatial audio rendering point extension system 140. The visual system 110 is configured to provide visual images to a user. For example, the visual system 12 may comprise a virtual reality (VR) headset, goggles or glasses. The audio system 120 is configured to provide audio sound to the user, such as by one or more speakers, a VR headset, or ear buds for example. The relative location system 130 is configured to sense a location of the user, such as the user's head for example, and determine the location of the user in the realm of the reality content consumption space. The movement in the reality content consumption space may be based on actual user movement, user-controlled movement, and/or some other externally-controlled movement or predetermined movement, or any combination of these. The user is able to move in the content consumption space of the free-viewpoint. The relative location system 130 may be able to change what the user sees and hears based upon the user's movement in the real-world; that real-world movement changing what the user sees and hears in the free-viewpoint rendering.

The movement of the user, interaction with audio objects and things seen and heard by the user may be defined by predetermined parameters including an effective distance parameter and a reversibility parameter. An effective distance parameter may be a core parameter that defines the distance from which user interaction is considered for the current audio object. In some embodiments, the effective distance parameter may also be considered a modification adjustment parameter, which may be applied to modification of interactions, as described in U.S. patent application Ser. No. 15/293,607, filed Oct. 14, 2016, which is hereby incorporated by reference. A reversibility parameter may also be considered a core parameter, and may define the reversibility of the interaction response. The reversibility parameter may also be considered a modification adjustment parameter. Although particular modes of audio-object interaction are described herein for ease of explanation, brevity and simplicity, it should be understood that the methods described herein may be applied to other types of audio-object interactions.

The user may be virtually located in the free-viewpoint content space, or in other words, receive a rendering corresponding to a location in the free-viewpoint rendering. Audio objects may be rendered to the user at this user location. The area around a selected listening point may be defined based on user input, based on use case or content specific settings, and/or based on particular implementations of the audio rendering. Additionally, the area may in some embodiments be defined at least partly based on an indirect user or system setting such as the overall output level of the system (for example, some sounds may not be heard when the sound pressure level at the output is reduced). In such instances the output level input to an application may result in particular sounds being not decoded because the sound level associated with these audio objects may be considered imperceptible from the listening point. In other instances, distant sounds with higher output levels (such as, for example, an explosion or similar loud event) may be exempted from the requirement (in other words, these sounds may be decoded). A process such as dynamic range control may also affect the rendering, and therefore the area, if the audio output level is considered in the area definition.

The spatial audio rendering point extension system 140 is configured to provide a free-viewpoint audio rendering that includes a spatial audio rendering point extension and manages extension-driven audio object interactions for a user in addition to the rendering from the user location in the free-viewpoint content space. The spatial rendering point extension allows a user to hear, from an extended spatial rendering area corresponding to an extended spatial rendering point, at a higher level (or at all) audio sources that the user otherwise would not hear as well (or at all). In other words, the spatial rendering point extension allows a user to hear audio from additional audio sources at a higher level or volume (or from a different direction) than the user would otherwise hear, or allows a user to hear audio that the user would otherwise not hear at all, while the user is at the location in the free-viewpoint content space. The spatial rendering point extension defines at least one point and an area around it for which a secondary spatial rendering is generated. In other words, the extended spatial rendering point determined by the spatial rendering point extension may correspond to any of the location of a specific audio object, a specific area in the free-listening point audio space, or an area relative to either of these or the user location itself. The user may therefore receive a rendering from the user location and a secondary rendering from the spatial rendering point extension.

The spatial audio rendering point extension system 140 may provide increased depth and breadth to audio spatial audio experiences (for example, a richer spatial audio experience) by including in the secondary rendering audio objects of interest that otherwise would not be heard (or which would not be heard properly or at a lower level in an unenhanced spatial audio experience) due to distance or other factors, such as masking objects for example. The spatial audio rendering point extension system 140 may also provide richer spatial audio interactions (via proxy-based interactions) by allowing the user to observe audio object interactions relating to distant objects that would otherwise not be triggered and rendered.

Figure 2:
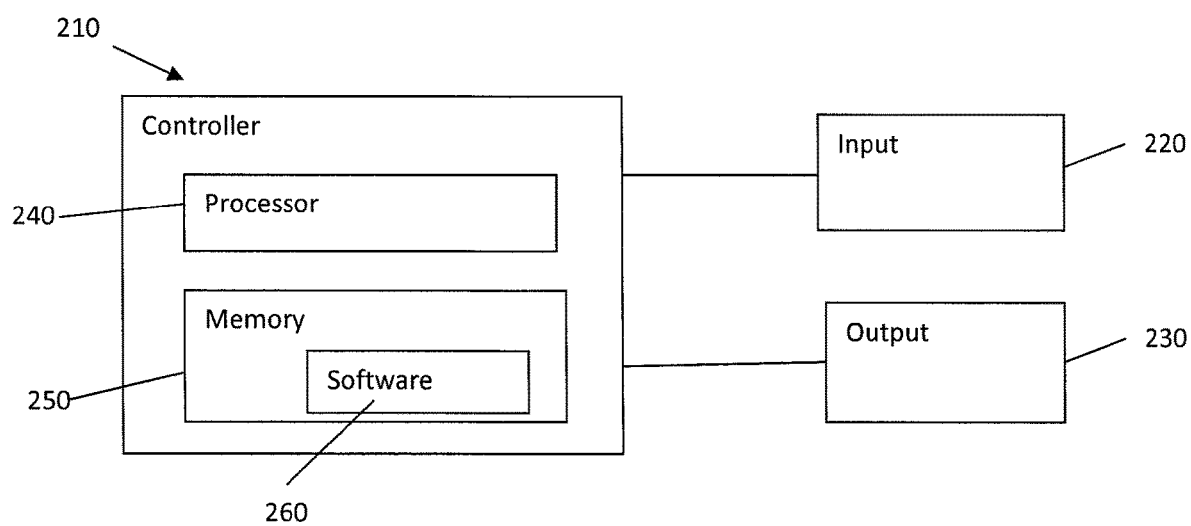
FIG. 2 is a diagram illustrating some components of the system shown in FIG. 1.

Referring also to FIG. 2, the reality system 100 generally comprises one or more controllers 210, one or more inputs 220 and one or more outputs 230. The input(s) 220 may comprise, for example, location sensors of the relative location system 130 and the spatial audio rendering point extension system 140, rendering information for a spatial audio rendering point extension from the spatial audio rendering point extension system 140, reality information from another device, such as over the Internet for example, or any other suitable device for inputting information into the system 100. The output(s) 230 may comprise, for example, a display on a VR headset of the visual system 110, speakers of the audio system 120, and a communications output to communication information to another device. The controller(s) 210 may comprise one or more processors 240 and one or more memory 250 having software 260 (or machine-readable instructions).

Referring also to FIGS. 3a and 3b, this presents an illustration of a user rendering point 305 and an extended spatial rendering point 360 and a corresponding extended spatial rendering area 370, which may be generated by the spatial audio rendering point extension system 140. The spatial audio rendering point extension system 140 may be implemented in free-viewpoint audio to allow a user to have stable control of audio objects and area-based audio rendering while on the move in the free viewpoint audio space. The spatial audio rendering point extension system 140 may determine at least one extended spatial rendering point 360, a spatial rendering point in addition to the free-viewpoint audio rendered at the user position, which may be relative to user position, relative to an audio object, relative to an absolute position in the space, or be defined as an absolute position in the space. The user may receive audio rendered in (or from) the extended spatial rendering area 370, an area which corresponds to the extended spatial rendering point 360. In some instances this may correspond to duplicating the user rendering point in a different part of the space. The spatial audio rendering point extension system 140 may allow the user to receive audio rendered from multiple different points, including the rendering point located at the user position and at least one extended spatial rendering point 360. There may be multiple extended spatial rendering points 360 corresponding to a single user. The additional audio sources, selected based on the extended spatial rendering area, may consist of audio objects that relate to a location of a specific audio object, a specific area in the free-listening point audio space (or free-viewpoint rendering), or an area relative to either of these or the user location itself.

FIG. 3a illustrates a user (or user rendering point) 305 who is located in a free-viewpoint audio space 300 and a set of audio objects (shown in FIG. 3 as audio objects 310, 320, 330 and 340). By way of illustration, audio objects that would be perceived (or heard, observed, felt, etc.) at a similar level of loudness from the rendering point of the user 305 are denoted in a same manner of shading. For example, all audio objects that would be perceived at the same level from a reference distance, such as, for example, 1 meter, are grouped according to the relative loudness level that would be observed from user position 305 (for example, audio objects 310, 320, 330, 340, respectively). Thus, in this instance, the user at user position 305 will hear better the audio objects that are close (audio objects 310), and the user's ability to perceive each audio object will depend largely on the distance between the listening point and the audio object (the playback level may be reduced in the renderer based on the distance, and there may be masking effects due to closer, louder objects). As the distance from the user position 305 increases, the level of perceptibility associated with the audio objects decreases. Audio objects 320 that are at an intermediate distance may be perceived (heard, felt, etc.) at a relatively lower loudness (or playback) level than closer objects 310. Audio objects 330 may be barely perceptible while audio objects 340 may not be perceived from user position 305 (imperceptible, i.e., the relative loudness level is zero). For example, the spatial audio rendering engine may not include audio objects 340 in its output at all for rendering point 305. The user may be interested in audio object 'X' (audio object 350). In FIG. 3a, the user is not able to properly hear this audio object as audio object 350 is at a lower loudness level (similar to 340) than (properly) observable from user position 305.

By utilizing the spatial audio rendering point extension system 140 to determine an extended spatial rendering point 360, as illustrated in FIG. 3b, the user at user position 305 may be able to hear the audio object 'X' which is situated at that position in the audio space. The extended spatial rendering point 360 in this instance is at the location of audio object 'X' (audio object 350) and the user may receive audio rendered corresponding to that location 360, where the rendering includes the audio object 350. Depending on the parameters of spatial audio rendering point extension, the perceivability of close-by audio objects may also be improved (for example, the close-by audio objects to audio object 350 may be within the extended spatial rendering area 370).

The spatial audio rendering point extension system 140 defines a modification of the spatial rendering for free-viewpoint audio in the audio space by determining an additional rendering point, the extended spatial rendering point 360, and a corresponding extended spatial rendering area 370. An audio object within the extended spatial rendering area 370 may be rendered for the user at user position 305 in terms of loudness according to how the audio object would be rendered if the actual rendering point for the user was at the location of the extended spatial rendering point 360. The size of the rendering area may in some instances be the same as for the user rendering area. In other instances, the size and shape of the rendering area defined by the spatial audio rendering point extension system 140 may differ from that of the area around the user position. In some embodiments the audio object's directional rendering may be determined according to the direction of arrival between the audio object 350 and the actual (or real) user location 305. The rendering of the direction within the extended spatial rendering area 370 may be modified in some spatial renderers. The directional parameters that may be selected for rendering the audio by the spatial audio rendering point extension system 140 may be selected based on particular use case requirements. The falloff in sound may be determined by separate falloff parameters for both the user rendering area and the extended spatial rendering area 370.

According to one embodiment, the extended spatial rendering associated with the extended spatial rendering point 360 may be altered or stopped based on a change of predetermined magnitude in the user location. For example, in instances in which the user 305 moves (for example, "jumps" to a different location in the free-viewpoint audio space 300), spatial audio rendering point extension system 140 may stop rendering the audio associated with the extended spatial rendering point 360. In other words, the location of the user (or user rendering point) 305 may affect the additional audio rendering from the extended spatial rendering point 360 and the spatial audio rendering point extension system 140. For example, the extended spatial rendering point location may be defined relative to the user rendering location and thus "copy" the movement of the user.

A minimum set of properties or characteristics of an audio object relating to how the object is rendered may be the audio track and the object's location in the "rendered" space. In one example a size property would also be used. This could be used for indicating how many speakers in a speaker setup would be rendering the audio object based on its current location for example. For example, an audio object corresponding to a helicopter may be mixed to hover at a certain distance over the user and then fly away to user's front right. In practice, the audio track corresponding to the helicopter may accordingly be panned through the most appropriate speakers (or whatever is the user's setup) during the rendering.

The audio track of an audio object may be a monophonic track, a stereo track, or a multi-channel track. Furthermore, the audio track may include additional metadata for spatial reproduction. Some form of spatial track is preferred for high-quality rendering. However, a mono audio track may also be utilized. In more advanced embodiments, there may be additional properties. Such additionally properties may include, for example, direction and directiveness of an audio source.

Features as described herein may be used for a new spatial audio rendering point extension for improved user experience of free-viewpoint audio. Features may be used, for example, with augmented-reality (AR), virtual-reality (VR), and presence-captured (PC) experiences and content consumption. In particular, the features may be used with spatial audio, such as object-based audio, and user interactions and user interfaces.

With free-viewpoint in audiovisual consumption a user may move, for example, continuously or in discreet steps in an area around the point corresponding to capture (such as the position of a NOKIA OZO device) or, for example, between at least two such capture points. The user may perceive the audiovisual scene in a natural way at each direction at each location in the allowed area of movement. When at least some part of the experience is simulated, such as by means of computer-generated additional effects or modifications of the captured audiovisual information for example, such experiences may be referred to using an umbrella term "mediated reality experience". The content may be captured (thus corresponding to perceived reality), computer-generated, or combination of the two. It may be pre-recorded or pre-generated or, for example, live footage. The captured content and data may include, for example, spatial audio and video, point clouds, and geo-location data which may be obtained by means of radio-frequency (RF) tracking for example. RF tracking may be based on HAIP technology (high-accuracy indoor positioning) for example. An audio object may be captured or generated.

Referring also to FIGS. 4a to 4c, alternatives of how a spatial rendering point extension may define the spatial rendering area (for example, an area/areas of perceptibility for the user) are shown according to particular embodiments. FIG. 4a presents an instance in which the area covered by the user position 305 (the user rendering area) and the extended spatial rendering area 370 form a combined audio perceptibility area 410. The area around the user 305 is connected to the extended spatial rendering area 370 around the at least one extended spatial rendering point 360, and all the content in between may also be covered by the modification in this instance. FIG. 4b illustrates an adaptive audio perceptibility area 420, a flexible arrangement that may adapt to the distance between the at least two locations. In some embodiments, parameters on how the adaptive audio perceptibility area 420 is determined out may be sent as metadata to the spatial rendering engine (e.g., from a device associated with the user, an administrator for the VR system, etc.). The parameters may, for example, define a narrower area for intermediate distances between the user position 305 and the extended spatial rendering point 360. These parameters may be sent out as metadata and allow a flexible arrangement that may adapt to the distance between the at least two locations. For example, when the distance between the at least two locations becomes smaller, the shape of the adaptive audio perceptibility area 420 may begin to resemble the shape of the combined audio perceptibility area 410. On the other hand, when the distance between the at least two locations grows larger, the shape of the adaptive audio perceptibility area 420 may change such that the narrow area becomes ever narrower and ultimately goes away leaving only independent areas around the at least two locations as seen, for example, in FIG. 4c. FIG. 4c illustrates an instance in which the at least two areas (the actual user rendering area 440 around the user position 305 and the extended spatial rendering area 370 around the extended spatial rendering point 360) are independent 430.

Figure 5:
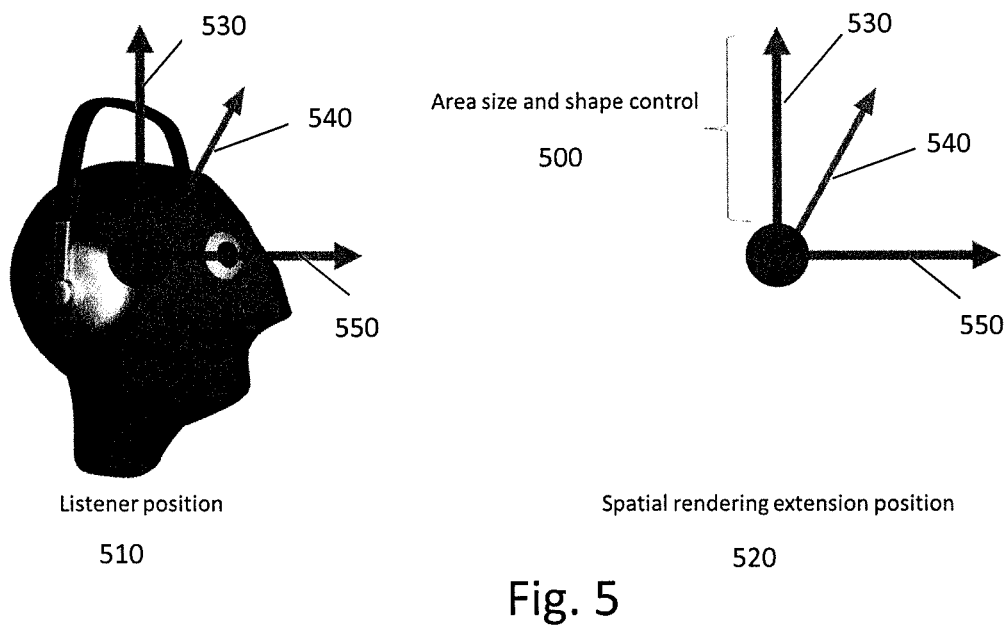
FIG. 5 illustrates an example embodiment of a area and shape control for a listener position and an extended spatial rendering area corresponding to a spatial rendering point extension.

Referring also to FIG. 5, an area and shape control 500 for a listener position 510 and the extended spatial rendering area 370 corresponding to (or covered by) a spatial rendering extension position 520 (for example, corresponding to an extended spatial rendering point 360) are illustrated. The extended spatial rendering area 370 may be subject to gain and focus control in multiple dimensions (for example, dimensions 530, 540, and 550, which may correspond to a Cartesian mapping in three dimensions). A similar gain or focus control may be implemented also for the listener position 510 (for example, the actual rendering position which may correspond to user location 305 and may include the actual user rendering area 440). The area size and shape may be controlled in three dimensions. The control may be automatic, and the shape or size may change over time based on criteria provided by/for the user. The extended spatial rendering area 370 may also be defined in terms of relative loudness levels and distance in particular dimensions (e.g., the relative loudness level may be determined to decrease based on parameters associated with a particular dimension and distance). Other controls may be exerted for the extended spatial rendering area 370, such as a rotation control for rotation of the extended spatial rendering area. In embodiments in which the rendering extension includes a form of adaptation of the rendering direction (of the extended rendering), the direction remains relative to the user rendering position. When no direction adaptation is implemented, the rotation control may still allow for focusing to certain parts of the audio space, etc. In addition, parameters such as a falloff parameter may be applied to define the changes in the extended spatial rendering area.

According to an embodiment, the extended spatial rendering point 360 may define a spatial audio rendering via a proxy. The proxy may be located at a proxy rendering point in space that corresponds to the the free-viewpoint rendering. The proxy rendering point may include an extended spatial rendering point 360 that includes additional properties of performing as a proxy for the user. The proxy rendering point is located at a different location to the user location 305. In other words, the proxy rendering point may be a particular instance of the extended spatial rendering point 360 that has additional properties of proxy-based interaction. The proxy may determine audio object interaction in a similar manner as described in U.S. patent application Ser. No. 15/293,607, filed Oct. 14, 2016, which is hereby incorporated by reference. In this instance, an audio object interaction may be triggered based on a detection of a locational conflict abnormality. In other words, when a rendering point is considered to begin overlapping with an "interaction boundary" of an audio object, the audio object may respond by a modification that may relate to at least one of several parameters or playback characteristics of the audio object. A user coming in contact with an audio object may thus affect the way the audio object is rendered. In contrast, in the instance of the proxy rendering point determined by the spatial audio rendering point extension system 140, the audio object may respond to an interaction by a proxy based on parameters associated with the proxy rendering point. The response may modify the audio object rendering in a manner that is different than in the case of a real, direct interaction.

Figure 6A:
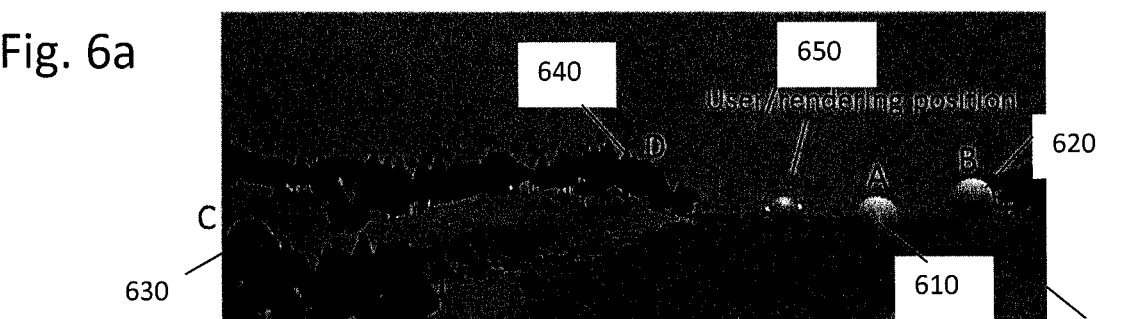
FIGS. 6a-6c illustrate a spatial rendering extended position triggering an interaction with an audio object.

Referring also to FIG. 6a, an instance in which a user is listening to a free-viewpoint audio experience in a virtual (or augmented) environment 600 that includes multiple audio objects at different locations with respect to the user position 650 is illustrated. In this particular instance the user may navigate along a river using an application and listen to audio objects that represent various sounds of nature. The audio scene may be rich (e.g., tens, hundreds, or thousands of audio objects), but for purposes of simplification four audio objects (610, 620, 630 and 640) are shown in virtual environment 600. From his current position 650 in the audio space, as seen in FIG. 6a, the user may easily perceive audio objects A (610) and B (620). However, the user may be unable to hear audio objects C (630) and D (640), which are out of the range of perceptibility (for example, too far away) of the current user position 650 (audio object C 630) and largely blocked by the woods (audio object D 640), respectively.

Figure 6B:
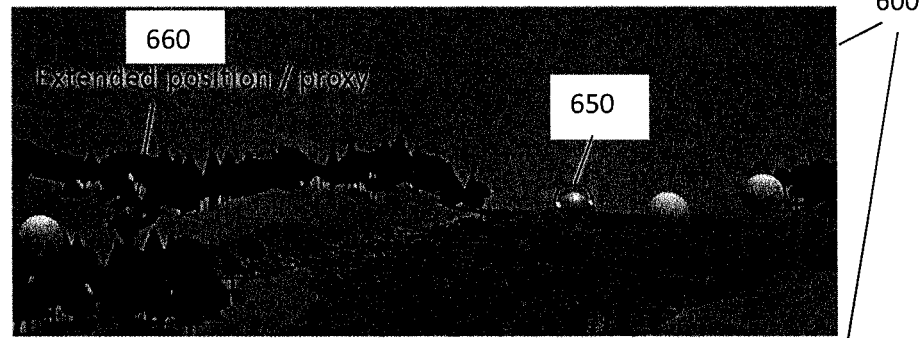

In FIG. 6b the user is using the extended spatial rendering point 360 and an extended spatial rendering point 660 as a proxy implemented at a location away from the user position 650 in the virtual or augmented environment 600. The extended area 370 around the extended spatial rendering point 360, determined by the spatial audio rendering point extension system 140, may follow the user 650 on the opposite side of the river, allowing the user 650 to better hear the audio from that side. For example, the user 650 may be short of time, and this approach may allow the user 650 to experience as much as possible in a shorter time. The user can now hear the audio object C even though the actual user location in the free-viewpoint rendering is at 650. In other embodiments, the spatial audio rendering point extension based on the extended spatial rendering point 360 may allow the user to determine dangers in the virtual environment or conduct surveillance in the extended spatial rendering area 370 that is based around the extended spatial rendering point 360.

Figure 6C:
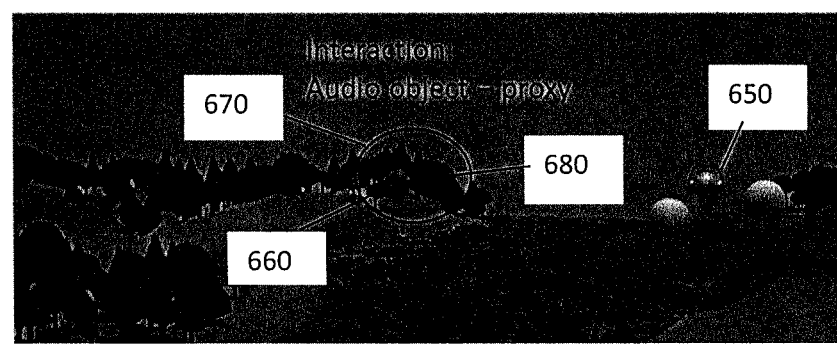

FIG. 6c illustrates a later moment in which the user's new proxy rendering (listening) point 660 triggers an interaction with audio object D 640, causing audio object D to change states (interactive state 680). The audio object in the interactive state 680 may manifest behavior corresponding to the user (or alternatively, the proxy 660) entering the interactive area 670. For example, there may a herd of deer on the other side of the river. An interaction with the audio object D may trigger the herd to run away (for example, audio object D may be associated with or represent the herd). Thus, even though the user is at the location 650, the spatial audio rendering extension 360 and the related audio object interaction (the proxy 660 entering interactive area 670 and triggering interactive state 680) enable a richer free-viewpoint audio experience for the user based on providing an additional rendering point which the user may control and interaction between the proxy located at the proxy rendering point 660 determined by the extended spatial rendering point 360 and audio objects in the virtual environment.

In some instances, the spatial audio rendering point extension may allow interaction detection and audio object rendering modification via the proxy 660. U.S. patent application Ser. No. 15/293,607 further defines a set of parameters that change the rendering of the audio object based on an audio object interaction and that themselves are modified according to the characteristics of the audio object interaction. Multiple different approaches using these parameters may be applied to determine rendering associated with the proxy 660 (including for the audio object 640 that the proxy 660 interacts with) at the proxy rendering point by the spatial audio rendering point extension.

According to an embodiment, a non-interactive approach (or response) to the positioning of the proxy 660 within a predetermined proximity of the audio object 640 would not cause an interaction-based modification. The audio object D 640 may not change states to the state denoted by audio object D 680, as shown in FIG. 6c. The scenario of FIG. 6c would not happen and instead, audio object D 640 would simply become perceivable due to the spatial audio rendering extension 360. This approach may limit the depth of experiences in the augmented or virtual environment and restrict or eliminate interactions such as shown by FIG. 6c. This approach may be controlled by an additional parameter. In some instances, proxy-based audio-object interaction may not correspond with what the user sees in a VR application. If what is happening is not visible to the user, the administrators may determine to allow more proxy-based interaction. If what is happening is visible to the user, the administrators may determine to limit the types of proxy-based interactions that are allowed or preclude the proxy-based interactions altogether.

According to another embodiment, the proxy-based interaction may be determined in a manner that is equivalent to an actual interaction. However, many interaction-based modifications may make sense (for example, are consistent with the rules or logic of the augmented or virtual environment) only when rendering a truly close-by object. This approach of rendering in a similar manner to a user interaction with an audio object may be disallowed in application to proxy-based interactions to avoid issues with the logic of the rendering in the augmented or virtual environment.

Another embodiment may include a mixture of two approaches in which predetermined types of interaction-based modifications are performed for all proxy-based interactions and other proxy-based interactions are avoided (for example, the non-interactive approach). The mixed response may be determined based on a mixture of the non-interactive response and an actual user interaction. In further embodiments, a combination of the different approaches may be used based on factors associated with the audio objects, user selection, etc. The scenarios (including variables) provided may be backward compatible to allow a renderer that does not read and understand particular secondary parameters to remain compatible with the scenarios that are provided that use the particular secondary parameters to determine rendering for proxy-based interaction.

The secondary parameters may be applied to improve the predictability and quality of rendering over the backwards-compatible options discussed above. For example, a secondary parameter set may be used for the proxy-based interactions. These proxy-based interactions may be rendered based on secondary parameters that define/control the proxy-based interactions in the augmented or virtual environment. In this embodiment, in the absence of the secondary parameter, any default renderer action may be permitted. Further, in some instances, the effective distance and reversibility parameters may be different for the main parameters used for the user-based interaction, and may be modified by the renderer based on the extended spatial rendering area 370. Therefore, changes in the area shape, such as shown in FIGS. 4a to 4c, may be taken into account. This approach to differentiating between proxy-based interaction and user-based interaction with an audio object may increase the relevance (and importance) of the direction from which the proxy-based interaction happens. For example, the proxy-based interaction in FIG. 4c may be triggered when the audio object is between the at least two rendering areas or on the far side of the at least one extended spatial rendering area 370 (away from the direction of the user position 305).

The audio objects included into the at least one secondary spatial rendering are mixed at their respective playback level (amplification) to the spatial rendering of the user's actual location in the scene. In some embodiments, the spatial direction of the audio objects may be based on the actual direction, but this parameter may also be modified at least for one of the additional audio objects.

According to an embodiment, the extended spatial rendering point determined by the spatial rendering extension 360 may be determined to be in a permanent state of proxy-based interaction. For example, if a particular audio object (such as in FIG. 3 or alternatively a point relative to an audio object) is selected as the location (or point) of the extended spatial rendering point 360, the audio object may be automatically and permanently determined to be in a state of proxy-based interaction. An additional parameter may be applied to control whether this interaction is allowed to occur in the augmented environment. In some instances the user, or the content creator, may select to allow or deny this interaction based on whether the action is a desired interaction.

Figure 7:
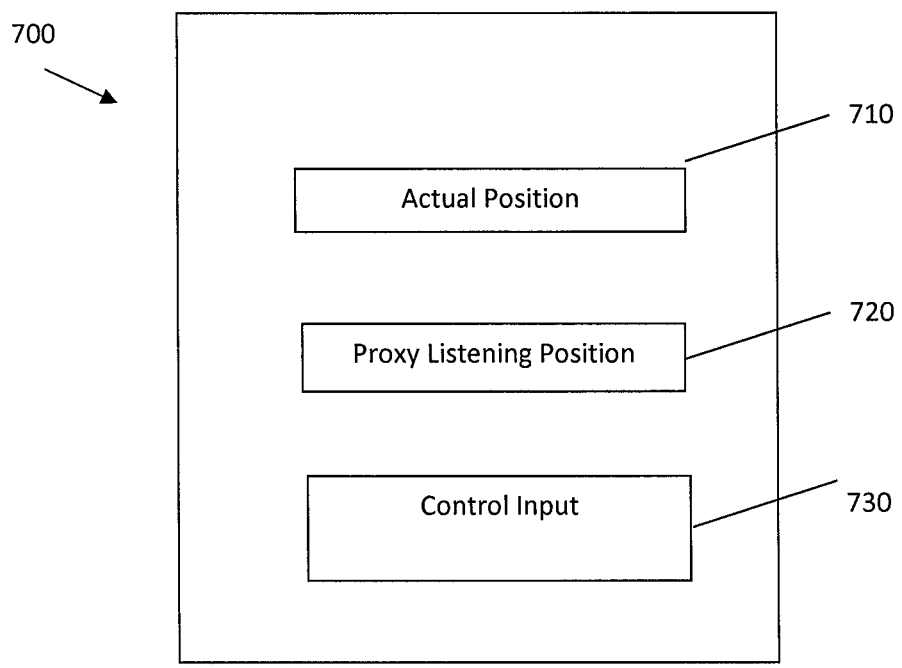
FIG. 7 is a diagram illustrating a user interface for use with the spatial rendering point extension.

Referring now to FIG. 7, a user interface 700 for use with the spatial rendering point extension is shown. If a user is relocated (for example, "jumps") to a completely new location (for example, to a location in which a current relationship between the user location and the extended spatial rendering point determined by the extended spatial rendering point 360 is significantly altered) via control inputs 730 provided to the user interface 300, the extended spatial rendering point 360 may or may not continue to be applied based on predetermined settings for the augmented or virtual environment 600. The response to the change in user location to a completely new location may be implemented in various ways depending on the use case, the renderer and the application.

In some embodiments, the user may have a user interface 700 that includes controls 730 to mute either the actual location rendering 710 or the proxy rendering location 720 corresponding to the extended spatial rendering area. In further embodiments, the user interface may allow the user to switch the actual location between the at least two locations. In this instance the proxy based interactions may be switched to correspond to the former actual location 710 of the user and the direct interactions may be switched to correspond to the former proxy rendering point 720 (as illustrated on user interface 700).

Figure 8:
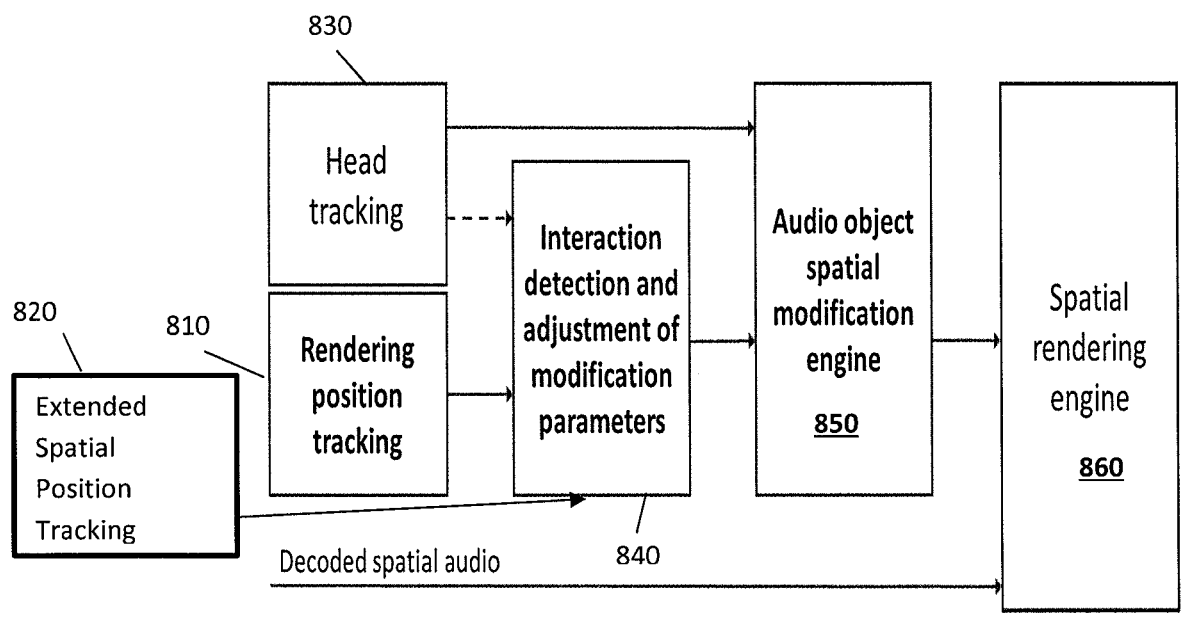
FIG. 8 is a diagram illustrating some components of a spatial audio rendering point extension system.

In FIG. 8, a block diagram of some features of an example embodiment of a reality system with a spatial rendering extension 800 is shown. 'Rendering position tracking' 810 refers to tracking of the user position or viewpoint. 'Extended spatial position tracking' 820 refers to tracking of the at least one extended spatial rendering point. These may be combined with the headtracking 830 functionality. Conventional tracking system(s) may be used for the tracking 810, 820, and 830. Interaction detection 840 defines when audio object rendering should be modified. In some embodiments, the rendering position tracking 810, extended spatial position tracking 820 and headtracking 830 may be implemented based on a combination of software and hardware with some functionality performed by software (for example, extended spatial position tracking 820). In addition, the audio object spatial modification engine 850 may define the extent to which modification should be performed based on the user position or extended spatial rendering point (which may in some instances comprise a proxy rendering point).

Audio object spatial modification engine 850 may include an enhanced spatial renderer, or a modifier block prior to a spatial renderer 860, which may modify the audio object or audio objects according to a detected user interaction and/or extended spatial rendering point interaction with the audio object or audio objects. In some embodiments, the modification based on interaction with the extended spatial rendering point may be determined based on a proxy and a secondary set of parameters may be applied to determine the rendering. Interaction may be detected based on the position of the rendering, the position of the extended spatial rendering point, the location of the audio object, the secondary parameter set and an umbrella parameter referred to as an 'Effective distance' parameter.

The system 800 may provide free view spatial rendering in which hearing resolution is expanded in such a way that the spatial audio user experience becomes richer (more detailed, interactive) in terms of simultaneous perceivable content of an audio scene where sounds which are normally inaudible (due to distance or masked by other objects) are perceived.

The system 800 may provide richer spatial audio experiences by including in the rendering audio objects of interest that otherwise would not be heard properly due to distance or, for example, masking objects. The system 800 may provide richer spatial audio interactions by allowing user to observe audio object interactions relating to distant objects that would otherwise not be triggered and rendered.

The system 800 may provide control of the extent of spatial audio rendering. The system 800 may also provide tools for free-viewpoint audio content creator to incorporate the extended spatial rendering point and, in some instances, proxy interactions. Aspects of the spatial audio rendering point extension system 140 (for example, including spatial rendering extension 800) may be implemented in encoding and transport, including metadata used to communicate information, such as content creator settings, preferences for individual audio objects and audio space to the spatial renderer 860.

Figure 9:
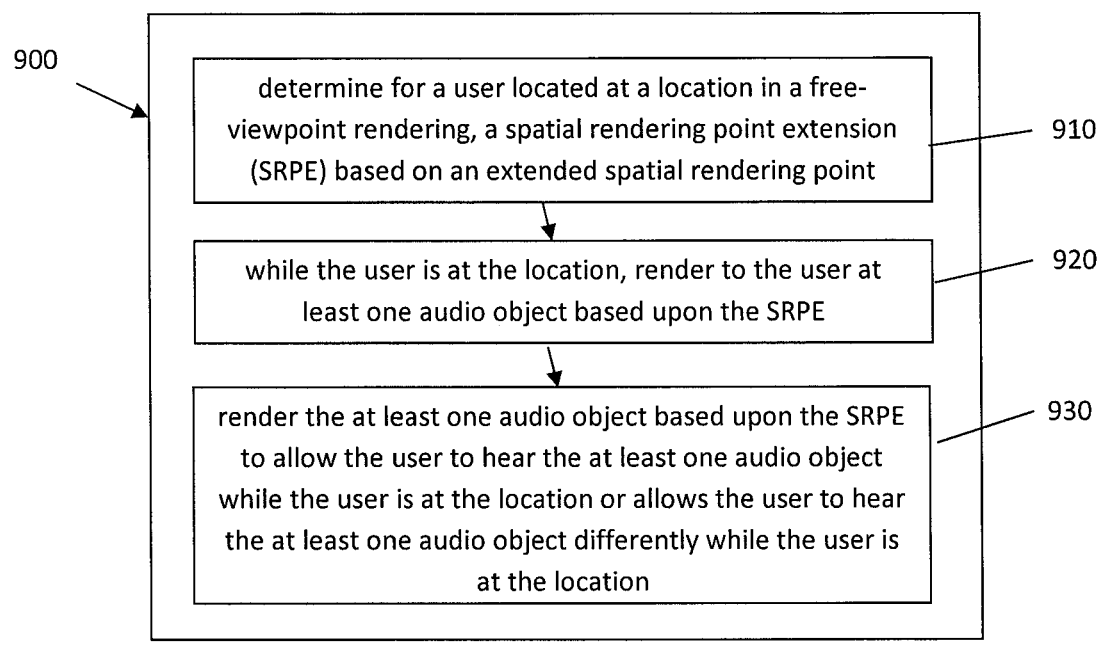
FIG. 9 is a diagram illustrating an example method.

FIG. 9 presents an example of a process of implementing the spatial rendering point extension.

At block 910, for a user located at a location in a free-viewpoint content space, a spatial rendering point extension (SRPE) based on an extended spatial rendering point 360, where the extended spatial rendering point 360 is spaced away from the location in the free-viewpoint content space (or the location of the user in it). The spatial rendering point extension may cover an extended spatial rendering area 370 that includes (or is based on/around) the extended spatial rendering point 360.

At block 920, while the user is at the location, the process includes rendering to the user at least one audio object based upon the determined spatial rendering point extension. Without the spatial rendering point extension the at least one audio object is either not able to be heard by the user while the user is at the location, or is heard differently by the user while the user is at the location.

At block 930, the rendering of the at least one audio object based upon the determined spatial rendering point extension may allow the user to hear the at least one audio object while the user is at the location or allow the user to hear the at least one audio object differently while the user is at the location.

In some instances, the spatial rendering point extension may be provided via a proxy. The proxy may be a particular instance of the extended spatial rendering point 360, which performs proxy-based interactions with audio objects in the free-viewpoint rendering. The rendering of the at least one audio object based on the proxy may be based on a secondary parameter set. The secondary parameter set may also define proxy-based interaction between the proxy, which is located away from the user location, and the at least one audio object, which may be unperceivable from the user location.

The rendering of the at least one audio object may include determining that the proxy rendering point and the at least one audio object are within an interactive area, and determining a proxy-based interaction between the proxy rendering point and the at least one audio object.

The rendering of the at least one audio object may further include determining a rendering modification based on the proxy-based interaction.

In accordance with an example, a method may include determining, for a user located at a location corresponding to a free-viewpoint rendering, a spatial rendering point extension, where the spatial rendering point extension is spaced away from the location in the free-viewpoint rendering. While the user is at the location, the method may include rendering to the user at least one audio object based upon the spatial rendering point extension, where without the spatial rendering point extension, the at least one audio object is either not able to be heard by the user while the user is at the location, or is heard differently by the user while the user is at the location. The rendering of the at least one audio object based upon the spatial rendering point extension allows the user to hear the at least one audio object while the user is at the location or allows the user to hear the at least one audio object differently while the user is at the location.

In accordance with another example, an example apparatus may comprise at least one processor; and at least one non-transitory memory including computer program code, the at least one memory and the computer program code configured to, with the at least one processor, cause the apparatus to: determine, for a user located at a location corresponding to a free-viewpoint rendering, a spatial rendering point extension, where the spatial rendering point extension is spaced away from the location in the free-viewpoint rendering; and while the user is at the location, rendering to the user at least one audio object based upon the determined spatial rendering point extension. Without the spatial rendering point extension the at least one audio object is either: not able to be heard by the user while the user is at the location, or is heard differently by the user while the user is at the location. The rendering of the at least one audio object based upon the determined spatial rendering point extension allows the user to hear the at least one audio object while the user is at the location or allows the user to hear the at least one audio object differently while the user is at the location.

The spatial rendering point extension may determine at least one secondary spatial rendering, and mix audio objects in the at least one secondary spatial rendering at a respective playback level for each of the audio objects to a spatial rendering for the user located at a location corresponding to a free-viewpoint content space (for example, to the user's actual location in the scene).

In accordance with another example, an example apparatus may comprise a non-transitory program storage device readable by a machine, tangibly embodying a program of instructions executable by the machine for performing operations, the operations comprising: determining, for a user located at a location in a free-viewpoint content space, a spatial rendering point extension based on an extended spatial rendering point, where the extended spatial rendering point is spaced away from the location in the free-viewpoint rendering. While the user is at the location, the operations may further comprise rendering to the user at least one audio object based upon the determined spatial rendering point extension. Without the spatial rendering point extension the at least one audio object is either not able to be heard by the user while the user is at the location, or is heard differently by the user while the user is at the location.

In accordance with another example, an example apparatus comprises: means for determining, for a user located at a location in a free-viewpoint content space, a spatial rendering point extension based on an extended spatial rendering point, where the extended spatial rendering point is spaced away from the location in the free-viewpoint content space. While the user is at the location, the means may further render to the user at least one audio object based upon the determined spatial rendering point extension. Without the spatial rendering point extension the at least one audio object is either not able to be heard by the user while the user is at the location, or is heard differently by the user while the user is at the location.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
determining, for a user located at a location corresponding to a first listening point in a free-viewpoint rendering, a spatial rendering point extension, where the spatial rendering point extension comprises at least one location having at least a different second listening point in the free-viewpoint rendering; and
while the user is at the location, rendering, with a processing device, to the user at least one audio object based upon the spatial rendering point extension,
where the rendering of the at least one audio object, based upon the spatial rendering point extension, allows the user to hear the at least one audio object based upon the different second listening point, where at least one of:
the at least one audio object would not be heard without rendering based upon the spatial rendering point extension while the user is at the location,
the at least one audio object would be heard at a higher level with rendering based upon the spatial rendering point extension than without rendering based upon the spatial rendering point extension while the user is at the location, or the spatial rendering point extension allows the user to hear the at least one audio object in a controlled manner while the user is at the location during rendering, wherein the controlled manner of hearing the at least one audio object comprises hearing the at least one audio object with at least one of:
  a different audio level, or
  a different direction
than a rendering based upon the location without the spatial rendering point extension, where rendering to the user the at least one audio object based upon the spatial rendering point extension further comprises:
  determining at least one secondary spatial rendering based on the spatial rendering point extension; and
  mixing the at least one audio object in the at least one secondary spatial rendering at a respective playback level for each of the at least one audio object with a spatial rendering for the user located at a location corresponding to a free-viewpoint rendering.

2. The method of claim 1 where the spatial rendering point extension is based on a proxy listening point, further comprising:
  determining that the proxy listening point and the at least one audio object are within an interactive area;
  determining a proxy-based interaction between the proxy listening point and the at least one audio object; and
  determining a rendering modification based on the proxy-based interaction.

3. The method of claim 2, where the determining of the rendering modification based on the proxy-based interaction between the proxy listening point and the at least one audio object further comprises:
  determining the rendering modification based, at least partially, on one of:
    a non-interactive response,
    an interaction based on a user interaction, or
    a mixed response based on the non-interactive response and the user interaction.

4. The method of claim 2, further comprising:
  providing an interface to switch a location of the user between the proxy listening point and the location corresponding to the first listening point, wherein, when the location of the user comprises the proxy listening point, proxy-based interactions are switched to correspond to the location corresponding to the first listening point and direct interactions are switched to correspond to the proxy listening point.

5. The method of claim 1, where the spatial rendering point extension corresponds to an extended spatial rendering area that includes one or more of:
  an audio object related to a location of a specific audio object,
  a specific area in the free-viewpoint rendering,
  an area relative to the location of the specific audio object,
  an area relative to the specific area in the free-viewpoint rendering, or
  an area relative to the location corresponding to the first listening point.

6. A method according to claim 1, where the method is one of:
  controlled based on user input, or
  automatically controlled.

7. The method of claim 1, where determining the spatial rendering point extension further comprises at least one of:
  determining the spatial rendering point extension relative to the location, relative to the at least one audio object, relative to an absolute position in the free-viewpoint rendering or as an absolute position in the free-viewpoint rendering.

8. The method of claim 1 where the spatial rendering point extension includes an extended spatial rendering area corresponding to an extended spatial listening point and rendering the at least one audio object comprises:
  rendering a direction within the extended spatial rendering area based on a use case requirement.

9. The method of claim 1, where the spatial rendering point extension corresponds to an extended spatial rendering area, further comprising:
  defining at least one of:
    a combined audio perceptibility area that includes at least an area covered with the location and the extended spatial rendering area, where the area covered with the location at least meets the extended spatial rendering area, or
    an adaptive audio perceptibility area that includes the extended spatial rendering area, the area covered with the location and an independent area from the area covered with the location adapted based on a distance between the extended spatial rendering area and the area covered with the location.

10. The method of claim 1, further comprising:
  determining area and shape control for an extended spatial rendering area corresponding to the spatial rendering point extension in three dimensions.

11. The method of claim 1, further comprising:
  muting rendering of at least one of the at least one audio object based upon the spatial rendering point extension and rendering of the at least one of the at least one audio object based upon the location.

12. An apparatus comprising:
  at least one processor; and
  at least one non-transitory memory including computer program code, the at least one memory and the computer program code configured to, with the at least one processor, cause the apparatus to:
    determine, for a user located at a location corresponding to a first listening point in a free-viewpoint rendering, a spatial rendering point extension, where the spatial rendering point extension comprises at least one location having at least a different second listening point in the free-viewpoint rendering; and
    while the user is at the location, rendering to the user at least one audio object based upon the spatial rendering point extension,
    where the rendering of the at least one audio object, based upon the spatial rendering point extension, allows the user to hear the at least one audio object based upon the different second listening point, where at least one of:
      the at least one audio object would not be heard without rendering based upon the spatial rendering point extension while the user is at the location,
      the at least one audio object would be heard at a higher level with rendering based upon the spatial rendering point extension than without rendering based upon the spatial rendering point extension while the user is at the location, or the spatial rendering point extension allows the user to hear the at least one audio object in a controlled manner while the user is at the location during rendering, wherein the controlled manner of hearing the at least one audio object comprises hearing the at least one audio object with at least one of:
a different audio level, or
a different direction
than a rendering based upon the location without the spatial rendering point extension,
where rendering to the user the at least one audio object based upon the spatial rendering point extension further comprises:
determining at least one secondary spatial rendering based on the spatial rendering point extension; and
mixing the at least one audio object in the at least one secondary spatial rendering at a respective playback level for each of the at least one audio object with a spatial rendering for the user located at a location corresponding to a free-viewpoint rendering.

13. An apparatus as in claim 12, where the spatial rendering point extension is based on a proxy listening point, the at least one memory and the computer program code are configured to, with the at least one processor, cause the apparatus to:
determine that the proxy listening point and the at least one audio object are within an interactive area;
determine a proxy-based interaction between the listening rendering point and the at least one audio object; and
determine a rendering modification based on the proxy-based interaction.

14. An apparatus as in claim 13, where determining the rendering modification based on the proxy-based interaction between the proxy listening point and the at least one audio object further comprises:
determining the rendering modification based, at least partially, on one of:
a non-interactive response,
an interaction based on a user interaction, or
a mixed response based on the non-interactive response and the user interaction.

15. An apparatus as in claim 12, where the spatial rendering point extension corresponds to an extended spatial rendering area that includes one or more of:
an audio object related to a location of a specific audio object,
a specific area in the free-viewpoint rendering,
an area relative to the location of the specific audio object,
an area relative to the specific area in the free-viewpoint rendering, or
an area relative to the location corresponding to the first listening point.

16. An apparatus as in claim 12, where determining the spatial rendering point extension further comprises at least one of:
determining the spatial rendering point extension relative to the location, relative to the at least one audio object, relative to an absolute position in the free-viewpoint rendering or as an absolute position in the free-viewpoint rendering.

17. An apparatus as in claim 12, where the spatial rendering point extension includes an extended spatial rendering area corresponding to an extended spatial listening point and when rendering the at least one audio object, the at least one memory and the computer program code are configured to, with the at least one processor, cause the apparatus to:
render a direction within the extended spatial rendering area based on a use case requirement.

18. An apparatus as in claim 12, where the spatial rendering point extension corresponds to an extended spatial rendering area, the at least one memory and the computer program code are configured to, with the at least one processor, cause the apparatus to:
define at least one of:
a combined audio perceptibility area that includes at least an area with the location and the extended spatial rendering area, where the area covered with the location at least meets the extended spatial rendering area, or
an adaptive audio perceptibility area that includes the extended spatial rendering area, the area covered with the location and an independent area from the area covered with the location adapted based on a distance between the extended spatial rendering area and the area covered with the location.

19. A non-transitory program storage device readable with a machine, tangibly embodying a program of instructions executable with the machine for performing operations, the operations comprising:
determining, for a user located at a location corresponding to a first listening point in a free-viewpoint rendering, a spatial rendering point extension, where the spatial rendering point extension comprises at least one location having at least a different second listening point in the free-viewpoint rendering; and
while the user is at the location, rendering to the user at least one audio object based upon the spatial rendering point extension,
where the rendering of the at least one audio object, based upon the spatial rendering point extension, allows the user to hear the at least one audio object based upon the different second listening point, where at least one of:
the at least one audio object would not be heard without rendering based upon the spatial rendering point extension while the user is at the location,
the at least one audio object would be heard at a higher level with rendering based upon the spatial rendering point extension than without rendering based upon the spatial rendering point extension while the user is at the location, or
the spatial rendering point extension allows the user to hear the at least one audio object in a controlled manner while the user is at the location during rendering, wherein the controlled manner of hearing the at least one audio object comprises hearing the at least one audio object with at least one of:
a different audio level, or
a different direction
than a rendering based upon the location without the spatial rendering point extension,
where rendering to the user the at least one audio object based upon the spatial rendering point extension further comprises:
determining at least one secondary spatial rendering based on the spatial rendering point extension; and
mixing the at least one audio object in the at least one secondary spatial rendering at a respective playback level for each of the at least one audio object with a spatial rendering for the user located at a location corresponding to a free-viewpoint rendering.

* * * * *